United States Patent
Ishihara et al.

(10) Patent No.: US 10,396,321 B2
(45) Date of Patent: Aug. 27, 2019

(54) BATTERY PACK SPACER

(71) Applicant: TOYOTA JIDOSHA KABUSHIKI KAISHA, Toyota-shi, Aichi-ken (JP)

(72) Inventors: Yuya Ishihara, Miyoshi (JP); Jumpei Terashima, Toyota (JP); Ayumu Kamakura, Toyota (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 672 days.

(21) Appl. No.: 15/063,978

(22) Filed: Mar. 8, 2016

(65) Prior Publication Data

US 2016/0268573 A1 Sep. 15, 2016

(30) Foreign Application Priority Data

Mar. 11, 2015 (JP) ................. 2015-048818

(51) Int. Cl.
 *H01M 2/10* (2006.01)
 *H01G 2/10* (2006.01)
 *H01M 10/0525* (2010.01)

(52) U.S. Cl.
 CPC ............ *H01M 2/1077* (2013.01); *H01G 2/10* (2013.01); *H01M 10/0525* (2013.01); *H01M 2200/00* (2013.01); *Y02T 10/7022* (2013.01)

(58) Field of Classification Search
 CPC .................................................. H01M 2/1077
 See application file for complete search history.

(56) References Cited

U.S. PATENT DOCUMENTS

| | | | |
|---|---|---|---|
| 2006/0099502 A1 | 5/2006 | Kim et al. | |
| 2008/0299453 A1* | 12/2008 | Shinyashiki | H01M 2/1061 429/152 |
| 2009/0061289 A1* | 3/2009 | Hamada | H01M 2/08 429/53 |
| 2009/0061299 A1* | 3/2009 | Uchida | H01M 2/1077 429/156 |
| 2010/0099023 A1 | 4/2010 | Kuroda et al. | |
| 2013/0065109 A1 | 3/2013 | Amagai et al. | |
| 2013/0252063 A1 | 9/2013 | Park | |
| 2015/0207120 A1* | 7/2015 | Mochizuki | H01M 2/1016 429/156 |

FOREIGN PATENT DOCUMENTS

| | | |
|---|---|---|
| CN | 102934258 A | 2/2013 |
| CN | 103325977 A | 9/2013 |
| CN | 104795521 A | 7/2015 |
| JP | 10-112301 A | 4/1998 |
| JP | 2006-048996 A | 2/2006 |

(Continued)

*Primary Examiner* — Barbara L Gilliam
*Assistant Examiner* — Nathanael T Zemui
(74) *Attorney, Agent, or Firm* — Sughrue Mion, PLLC (57) ABSTRACT

A battery pack spacer is divided into a first region and a second region, the first region includes an end portion in a first direction and occupies half of an entire region of the spacer in a second direction from the end portion in the first direction, the second region includes an end portion in the second direction and occupies half of the entire region of the spacer in the first direction from the end portion in the second direction, and the second region has higher compressibility in the single cell arrangement direction than the first region.

15 Claims, 5 Drawing Sheets

(56) References Cited

FOREIGN PATENT DOCUMENTS

| | | |
|---|---|---|
| JP | 2006-128120 A | 5/2006 |
| JP | 2008-108457 A | 5/2008 |
| JP | 2013-098137 A | 5/2013 |
| JP | 2015-138675 A | 7/2015 |
| KR | 10-2013-0043119 A | 4/2013 |
| KR | 10-1255250 B1 | 4/2013 |

\* cited by examiner

BATTERY PACK SPACER

INCORPORATION BY REFERENCE

The disclosure of Japanese Patent Application No. 2015-048818 filed on Mar. 11, 2015 including the specification, drawings and abstract is incorporated herein by reference in its entirety.

BACKGROUND OF THE INVENTION

1. Field of the Invention

The present invention relates to a battery pack spacer and a battery pack. Specifically, the invention relates to: a battery pack spacer and a battery pack, the battery pack spacer being capable of suppressing contact between terminals of single cells constituting the battery pack when a load of higher than the withstand load of the battery pack is applied from the outside to the battery pack.

2. Description of Related Art

The importance of a battery pack, which is constructed by connecting plural single cells to each other in series or in parallel, has increased as a power supply, for example, a vehicle-mounted power supply or a power supply for a PC, a portable device, or the like, the single cell being a storage element such as a secondary battery (for example, a lithium ion secondary battery or a nickel metal hydride battery) or a capacitor. In particular, a battery pack constructed by connecting plural light-weight lithium ion secondary batteries having high energy density as single cells to each other in series is preferably used as a vehicle-mounted power supply with high output.

Examples of prior art documents relating to a lithium ion secondary battery (single cell) include Japanese Patent Application Publication No. 2006-128120 (JP 2006-128120 A) and Japanese Patent Application Publication No. 2013-98137 (JP 2013-98137 A). JP 2006-128120 A discloses a cylindrical lithium ion secondary battery. JP 2013-98137 A discloses a flat lithium ion secondary battery. Further, examples of prior art documents relating to a battery pack in which lithium ion secondary batteries are used include Japanese Patent Application Publication No. 2006-48996 (JP 2006-48996 A) and Japanese Patent Application Publication No. 10-112301 (JP 10-112301 A). JP 2006-48996 A and JP 10-112301 A disclose a battery pack which is constructed by arranging a spacer plate (battery pack spacer) having high heat dissipation between single cells constituting the battery pack, for example, in order to cool the single cells.

In a battery pack which is used in, for example, a vehicle-mounted power supply, a situation is assumed in which a high load of higher than the withstand load of the battery pack is applied to the battery pack, for example, due to an automobile accident. In this way, when a part of single cells and battery pack spacers constituting the battery pack are damaged or deformed by a high load being applied from the outside to the battery pack, there may be contact between a terminal (positive electrode terminal or negative electrode terminal) of one single cell and a terminal (negative electrode terminal or positive electrode terminal) of another single cell adjacent to the single cell. The contact between the terminals is likely to occur, in particular, when a high load is applied to the battery pack in a single cell arrangement direction from at least one outside.

Contact between terminals of single cells causes short-circuiting of a battery, which is not preferable. Therefore, the creation of a technique is required which is capable of favorably preventing or suppressing contact between terminals of single cells even in a case where a battery pack is damaged or deformed by a high load of higher than the withstand load of the battery pack being applied to the battery pack.

SUMMARY OF THE INVENTION

The invention provides a battery pack spacer which is used in a battery pack so as to suppress contact between electrode terminals of single cells constituting the battery pack when a load of higher than the withstand load of the battery pack is applied from the outside to the battery pack. The invention also provides a battery pack in which contact between electrode terminals of single cells constituting the battery pack is suppressed using the battery pack spacer when a load of higher than the withstand load of the battery pack is applied from the outside to the battery pack.

According to a first aspect of the invention, there is provided a battery pack spacer which is arranged between adjacent single cells in a battery pack constructed by arranging a plurality of single cells in a predetermined arrangement direction. The battery pack spacer includes a first region and a second region. Each of the single cells includes terminals which protrude in a direction perpendicular to the arrangement direction. In the first aspect of the battery pack spacer disclosed herein, the direction in which the terminals protrude is set as a first direction, a direction opposite to the first direction is set as a second direction, in the first direction and the second direction of the battery pack spacer arranged between the single cells, the battery pack spacer is divided into the first region and the second region, the first region includes an end portion in the first direction and occupies half (½) of an entire region of the battery pack spacer in the second direction from the end portion in the first direction, the second region includes an end portion in the second direction and occupies half (½) of the entire region of the battery pack spacer in the first direction from the end portion in the second direction, and the second region has higher compressibility in the arrangement direction than the first region.

According to the battery pack spacer (hereinafter, referred to simply as "spacer") having the above-described configuration, when an excessive load of higher than the withstand load of a battery pack is applied from the outside to the battery pack (typically, in the single cell arrangement direction from at least one outside of the battery pack) such that at least a part of the load is applied to the spacer arranged between the single cells, the second region of the spacer is more likely to be compressed and deformed in the single cell arrangement direction than the first region. Therefore, by using the battery pack spacer, when the load is applied to a battery pack (typically, in the single cell arrangement direction), the distance between the adjacent single cells in the end portion in the second direction is more likely to be reduced than the distance between the adjacent single cells in the end portion in the first direction (that is, in the battery pack, the end portion in the second direction is more likely to collapse than the end portion in the first direction). As a result, contact between a terminal of one single cell, which protrudes in the first direction, and a terminal of another single cell adjacent to the single cell, which protrudes in the first direction, can be suppressed.

In another aspect of the battery pack spacer disclosed herein, the spacer is divided into a first region and a second region, the first region includes an end portion in the first direction and occupies half (½) of the entire region of the spacer in the second direction from the end portion in the first direction, the second region includes an end portion in the second direction and occupies half (½) of the entire region of the spacer in the first direction from the end portion in the second direction, and the second region has a lower withstand load in the single cell arrangement direction than the first region. According to the above-described configuration, when an excessive load is applied from the outside to a battery pack, the second region of the spacer is more likely to be damaged or deformed than the first region of the spacer. Therefore, according to the spacer having the above-described configuration, when the spacer is used in a battery pack and when an excessively load is applied from the outside to the battery pack, contact between terminals of single cells can be suppressed.

"Withstand load of the spacer" described in this specification refers to a load at which the spacer can withstand without being damaged or deformed when a load is applied to the battery pack in the single cell arrangement direction. "Withstand load of the battery pack" refers to a load at which at least one member (for example, a battery pack spacer or a single cell) constituting the battery pack can withstand without being damaged or deformed when a load is applied to the battery pack.

In still another aspect of the battery pack spacer disclosed herein, the end portion in the second direction has a smaller thickness in the single cell arrangement direction than the end portion in the first direction. By forming the end portion in the second direction having a smaller thickness in the single cell arrangement direction than the end portion in the first direction, when an excessive load of higher than the withstand load of a battery pack is applied from the outside to the battery pack (typically, in the single cell arrangement direction), the configuration in which the second region of the spacer is more likely to be compressed and deformed in the single cell arrangement direction than the first region of the spacer can be easily realized. In still another aspect of the battery pack spacer disclosed herein, a wedge-shaped space may be formed in a region from a portion of the end portion in the second direction toward the inside of the spacer. In still another aspect of the battery pack spacer disclosed herein, the second region may be mainly formed of a material having higher compressibility and/or a material having a lower withstand load than the first region (that is, the content of the material having higher compressibility and/or the material having a lower withstand load than the first region is higher than 50 wt % and preferably 70 wt % or higher with respect to the total weight of the region; hereinafter, the same shall be applied). Even with the above-described configuration, when an excessive load is applied from the outside to a battery pack (typically, in the single cell arrangement direction), the configuration in which the second region of the spacer is more likely to be compressed and deformed in the single cell arrangement direction than the first region of the spacer can be easily realized. In still another aspect of the battery pack spacer disclosed herein, the first region may be mainly formed of a polyolefin resin.

In still another aspect of the battery pack spacer, the second region may be mainly formed of an elastomer.

According to the technique disclosed herein, there is provided a battery pack which is constructed by arranging a plurality of single cells in a predetermined arrangement direction, the battery pack including one of the battery pack spacers disclosed herein that is arranged between adjacent single cells. According to the battery pack, when an excessive load of higher than the withstand load of the battery pack is applied from the outside to the battery pack, the second region of the spacer is more likely to be deformed (typically, compressed and deformed in the single cell arrangement direction) or damaged than the first region of the spacer. Therefore, when an excessive load is applied to the battery pack, contact between terminals of adjacent single cells can be suppressed. Further, short-circuiting between adjacent single cells, which is caused by contact between terminals of the single cells, can be suppressed.

The battery pack disclosed herein is preferable as a vehicle-mounted battery pack (for example, a power supply for a motor of a vehicle such as an automobile). In the vehicle-mounted battery pack, a situation is assumed in which a high load or impact is applied from the outside to the battery pack, for example, due to an automobile accident. In the battery pack disclosed herein, when a load of higher than the withstand load of the battery pack is applied from the outside to the battery pack, short-circuiting between adjacent single cells, which is caused by contact between terminals of the single cells, can be suitably suppressed. Therefore, the battery pack disclosed herein shows technical significance for the above-described use.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, a battery pack spacer according to the invention will be described based on preferable embodiments while appropriately referring to the drawings. Matters (for example, a method of constructing a battery pack which is not a characteristic of the invention) necessary to practice this invention other than those specifically referred to in this specification may be understood as design matters based on the related art in the pertinent field for a person of ordinary skill in the art. The invention can be practiced based on the contents disclosed in this specification and common technical knowledge in the pertinent field. In each drawing, a dimensional relationship (for example, length, width, or thickness) does not reflect the actual dimensional relationship.

In this specification, "single cells" refer to the term for individual storage elements constituting a battery pack and, unless specified otherwise, include batteries and capacitors having various compositions. "Secondary batteries" refers to all the batteries that can be repeatedly charged, including so-called storage batteries such as a lithium ion secondary battery or a nickel metal hydride battery. A storage element constituting a lithium ion secondary battery is typical example included in "single cell" described herein. A lithium ion secondary battery module (battery pack) including plural single cells is a typical example of "battery pack" described herein. In particular, the technique disclosed herein is preferably applicable to a battery pack which is constructed through the following steps of: arranging a predetermined number (for example 3 to 50) of single cells (for example, lithium ion secondary batteries) having a flat box-shaped external form, which are called square batteries, in a direction (laminating direction) in which flat wide side surfaces of the single cells are laminated; and connecting terminals of the single cells in series or in parallel.

Figure 1:
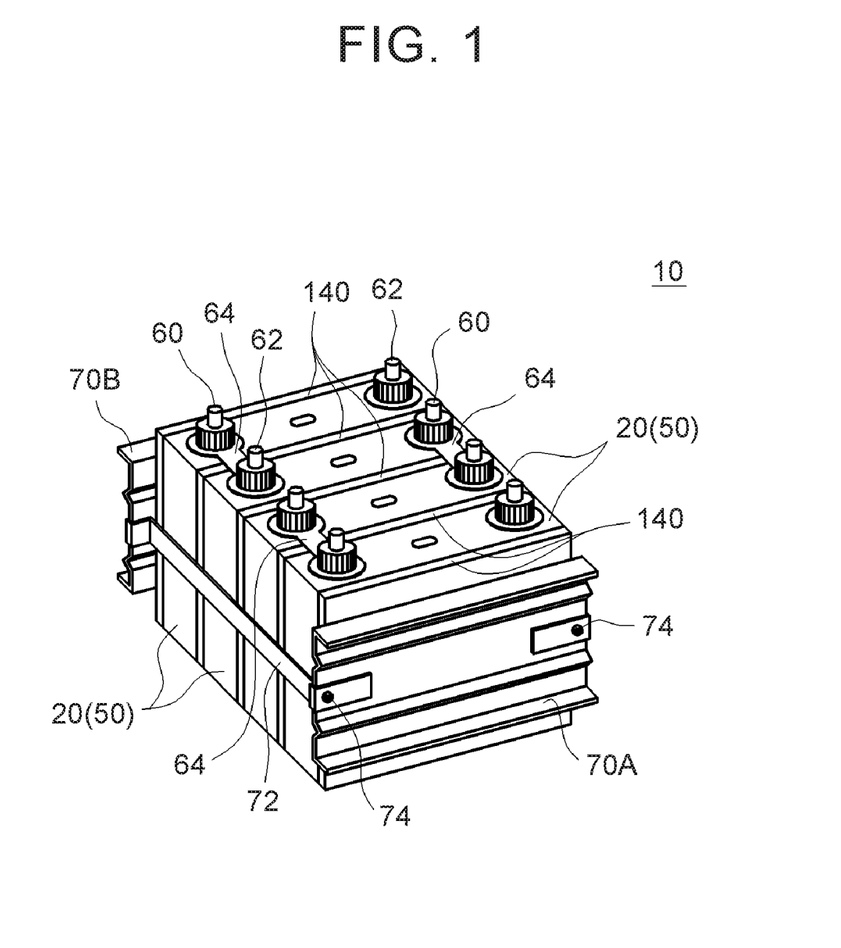
FIG. 1 is a perspective view showing a configuration of a battery pack according to an embodiment.

FIG. 1 shows a configuration of a battery pack according to an embodiment. A battery pack 10 according to the embodiment includes plural rechargeable single cells (here, lithium ion secondary batteries) 20. As in the case of a single cell included in a general battery pack of the related art, the single cell 20 has a configuration in which not only a flat wound electrode body including predetermined battery constituent materials (for example, sheet-shaped electrodes in which positive and negative electrode active materials are held in positive and negative electrode current collectors, respectively, and a separator) but also an appropriate electrolyte are accommodated in a case 50 having a shape capable of accommodating the electrode body (here, a flat cuboid shape, that is, a square shape). A material constituting the case 50 is not particularly limited and, for example, may be formed of the same material as that used in a typical single cell. From the viewpoints of, for example, heat dissipation of the single cell 20, it is preferable that the case 50 is formed of metal (for example, aluminum). On a top surface of the case 50, a positive electrode terminal 60 and a negative electrode terminal 62, which are electrically connected to a positive electrode and a negative electrode of a wound electrode body 80, respectively, are provided. In adjacent single cells 20, the positive electrode terminal 60 of one single cell 20 is electrically connected to the negative electrode terminal 62 of another single cell 20 through a connector 64. By connecting the plural single cells 20 to each other in series, the battery pack 10 having a desired voltage is constructed.

Figure 3:
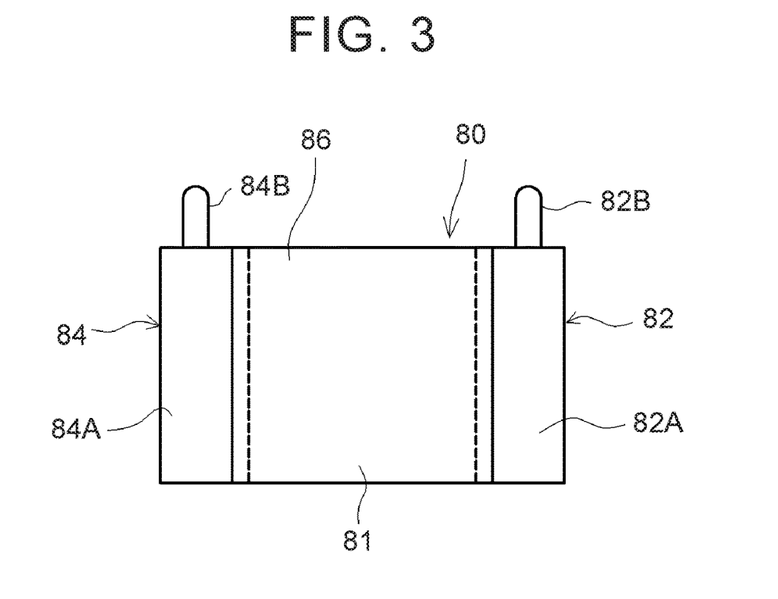
FIG. 3 is a front view showing a configuration example of an electrode body of a single cell.

Referring to FIG. 3, the internal structure of the single cell 20 will be described in more detail. As in the case of a wound electrode body of a typical lithium ion secondary battery, the electrode body 80 may be prepared through the following steps of: laminating an elongated sheet-shaped positive electrode 82 (hereinafter, referred to as "positive electrode sheet 82") and an elongated sheet-shaped negative electrode 84 (hereinafter, referred to as "negative electrode sheet 84") together with two elongated sheet-shaped separators 86 (hereinafter, referred to as "separator sheets 86") to obtain a laminate; winding the laminate in a longitudinal direction to obtain a wound body; and squashing the obtained wound body from a side surface direction (a horizontal direction with respect to a winding axis).

Here, the positive electrode sheet 82 and the negative electrode sheet 84 are wound in a state of being laminated after slightly shifting positions of the elongated sheets in a width direction thereof. As a result, in one end portion and the other end portion of the wound electrode body 80 in a winding axial direction, as shown in FIG. 3, a positive electrode protrusion (positive electrode terminal connection portion) 82A and a negative electrode protrusion (negative electrode terminal connection portion) 84A are formed, respectively. In the positive electrode protrusion 82A, one end of the positive electrode sheet 82 in the width direction protrudes from a winding core (that is, a portion where a positive electrode active material layer-forming portion of the positive electrode sheet 82, a negative electrode active material layer-forming portion of the negative electrode sheet 84, and the separator sheets 86 are densely wound) to the outside. In the negative electrode protrusion 84A, one end of the negative electrode sheet 84 in the width direction protrudes from the winding core portion 81 to the outside. A positive electrode lead terminal 82B and a negative electrode lead terminal 84B are provided in the positive electrode protrusion (that is, a positive electrode active material layer non-forming portion) 82A and the negative electrode protrusion (that is, a negative electrode active material layer non-forming portion) 84A, respectively. These lead terminals 82B, 84B are electrically connected to the positive electrode terminal 60 and the negative electrode terminal 62 described above, respectively.

The materials and the members constituting the wound electrode body 80 is not particularly limited and may be the same as those of an electrode body of a lithium ion secondary battery of the related art. For example, the positive electrode sheet 82 may be formed by providing a positive electrode active material layer, which contains a positive electrode active material for a lithium ion secondary battery such as a lithium transition metal composite oxide, on an elongated positive electrode current collector (for example, an aluminum foil having a thickness of 5 μm to 20 μm).

On the other hand, the negative electrode sheet 84 may be formed by providing a negative electrode active material layer, which contains a negative electrode active material for a lithium ion secondary battery such as graphite or a lithium transition metal oxide, on an elongated negative electrode current collector (for example, a copper foil having a thickness of 5 μm to 20 μm).

As the separator sheet 86 used between the positive and negative electrode sheets 82, 84, for example, a porous separator sheet formed of a polyolefin resin having a thickness of 5 μm to 30 μm can be preferably used.

The obtained flat wound electrode body 80 is accommodated in the case 50 such that the winding axis lies sideways as shown in FIG. 3 (that is, a portion of the electrode body 80 on the positive electrode protrusion 82A side and a portion of the electrode body 80 on the negative electrode protrusion 84A side are positioned in one end portion and the other end portion of the case 50 in the horizontal direction, respectively), an appropriate nonaqueous electrolytic solution (not shown) is injected into the case 50, and the case 50 is sealed. As a result, the single cell 20 is constructed. In the electrolytic solution, for example, it is preferable that a nonaqueous solvent (for example, a mixed solvent of diethyl carbonate and ethylene carbonate) contains an appropriate supporting electrolyte (for example, a lithium salt such as $LiPF_6$) in an appropriate amount (for example, concentration: 1 M).

Figure 2:
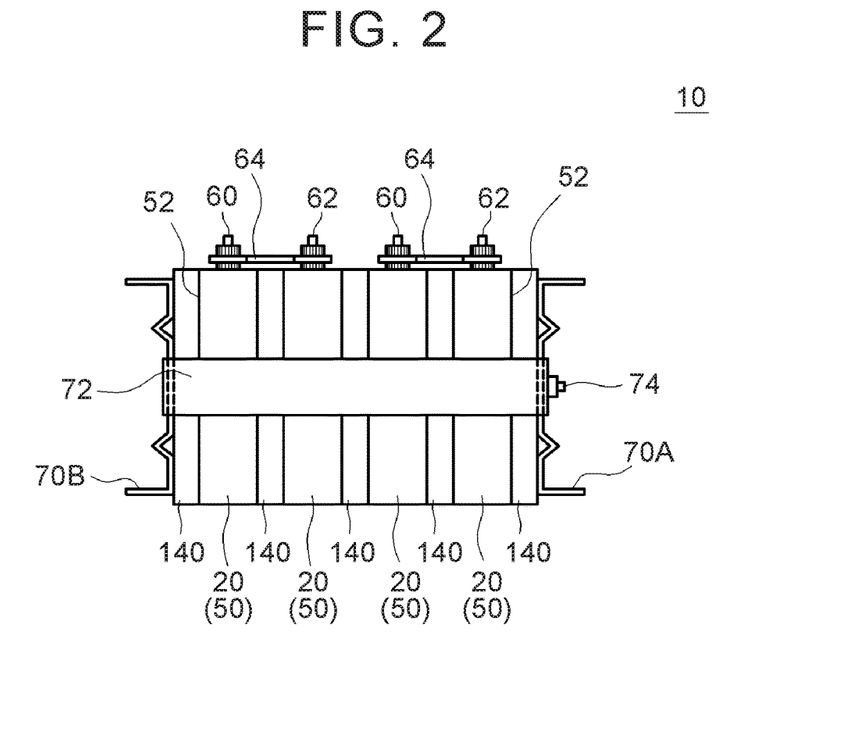
FIG. 2 is a side view showing the configuration of the battery pack according to the embodiment.

FIG. 2 is a side view showing the configuration of the battery pack 10 according to the embodiment. As shown in FIGS. 1 and 2, the battery pack 10 according to the embodiment is restricted in a state where a load is applied to the plural single cells 20 (here, four single cells 20 are shown) having the above-described configuration, which are arranged in a predetermined direction, in the arrangement direction. Specifically, the plural single cells 20 are reversed every second one such that the positive electrode terminals 60 and the negative electrode terminals 62 are alternately arranged, and are arranged in a direction (laminating direction) in which flat surfaces 52 forming side walls of the cases 50 (wide surfaces of the cases 50, that is, surfaces corresponding to flat surfaces of the wound electrode bodies 80 which are accommodated in the cases 50) face each other.

In the vicinity of the arranged single cells 20, a restraining member which collectively restricts the plural single cells 20 is arranged. That is, a pair of restraining plates 70A, 70B are arranged further outside of the single cell 20 that is arranged on the outermost side in the single cell arrangement direction. A fastening beam material 72 is attached so as to bridge the pair of restraining plates 70A, 70B. By fastening and fixing end portions of the beam material 72 to the restraining plate 70A through a screw 74, the single cells 20 can be restricted such that a predetermined load (for example, a surface pressure applied to the flat surfaces 52 is about $10^4$ Pa to $10^6$ Pa) is applied to the single cells 20 in the arrangement direction. At a level corresponding to the fastening degree of the beam material 72, the restraining load (surface pressure) is applied to the flat surfaces 52 of each single cell 20 in the fastening direction (that is, arrangement direction).

Here, a battery pack spacer 140 is arranged at least at one gap between the arranged single cells 20 (in the example shown in the drawing, gaps between the respective adjacent single cells 20 and both outsides in the single cell arrangement direction). In the battery pack spacer 140 shown in FIGS. 1 and 2, surfaces facing the adjacent single cells 20 (hereinafter, surfaces of the spacer 140 facing the single cells 20 (flat surfaces 52) will be referred to as "facing surfaces") have a flat shape having no convex and concave portions. That is, the entire region of the facing surfaces of the spacer 140 comes into close contact with the flat surfaces 52 of the single cell 20.

Although not shown in the drawing, the facing surface of the battery pack spacer 140 may have a rough shape. For example, at least one facing surface may have plural parallel groove-shaped concave portions or ridge-shaped convex portions that are formed over a region from one end to the other end in the horizontal direction. Alternatively, for example, at least one facing surface may have plural comb-shaped concave portions or comb-shaped convex portions. By the facing surfaces of the battery pack spacer 140 having the concave portions or the convex portions being pressed against the flat surfaces 52 of the adjacent single cells 20, a path through which a coolant passes is formed. The battery pack spacer 140 is arranged between the flat surfaces 52 of the single cells 20, and thus a coolant path is formed facing the spacer 140 (typically, between the spacer 140 and the flat surface 52 of at least one of the single cells 20 between which the spacer 140 is interposed). Therefore, the battery pack spacer 140 has a function of dissipating heat generated in the single cells 20

In the following description, a direction in which terminals (the positive electrode terminal 60 and the negative electrode terminal 62) included in the single cell 20 protrude will be referred to as a first direction. A direction opposite to the first direction will be referred to as a second direction. The battery pack spacer 140 can be divided into a first region and a second region, the first region includes an end portion of the battery pack spacer in the first direction, and the second region includes an end portion of the battery pack spacer 140 in the second direction. Here, the first region of the battery pack spacer 140 occupies half (½; volume ratio) of the entire region of the spacer 140 in the second direction from the end portion in the first direction. The second region of the battery pack spacer 140 occupies half (½; volume ratio) of the entire region of the spacer 140 in the first direction from the end portion in the second direction.

Here, in the battery pack spacer 140 disclosed herein, the second region has higher compressibility in the thickness direction of the spacer 140 (that is, in the single cell arrangement direction when the spacer 140 is used in the battery pack 10) than the first region. According to the battery pack spacer 140 having the above-described configuration, when an excessive load is applied from the outside to the battery pack 10 (typically, in the single cell arrangement direction from at least one outside of the battery pack 10) such that the load is applied to the spacer 140 arranged between the single cells 20, the second region of the spacer 140 is more likely to be compressed in the single cell arrangement direction than the first region. Therefore, the distance between the adjacent single cells 20 in the end portion in the second direction is more likely to be reduced than the distance between the adjacent single cells 20 in the end portion in the first direction (that is, in the battery pack 10, the end portion in the second direction is more likely to collapse in the single cell arrangement direction than the end portion in the first direction). Accordingly, during the application of the load, contact between a terminal (positive electrode terminal 60 or negative electrode terminal 62) of one single cell 20, which protrudes in the first direction, and a terminal (negative electrode terminal 62 or positive electrode terminal 60) of another single cell 20 adjacent to the single cell 20, which protrudes in the first direction, can be suppressed.

In the battery pack spacer 140 disclosed herein, it is preferable that the second region has a lower withstand load than the first region. According to the battery pack spacer 140 having the above-described configuration, when a load is applied from the outside to the battery pack 10 (typically, in the single cell arrangement direction from at least one outside of the battery pack 10) such that the load is applied to the spacer 140 arranged between the single cells 20, the second region is more likely to be damaged or deformed than the first region. Therefore, the distance between the adjacent single cells 20 in the end portion in the second direction is more likely to be reduced than the distance between the adjacent single cells 20 in the end portion in the first direction (that is, in the battery pack 10, the end portion in the second direction is more likely to collapse in the single cell arrangement direction than the end portion in the first direction). Accordingly, during the application of the load, contact between a terminal (positive electrode terminal 60 or negative electrode terminal 62) of one single cell 20, which protrudes in the first direction, and a terminal (negative electrode terminal 62 or positive electrode terminal 60) of another single cell 20 adjacent to the single cell 20, which protrudes in the first direction, can be suppressed. Alternatively, in the battery pack spacer 140 disclosed herein, it is preferable that the end portion in the second direction has a smaller thickness in the single cell arrangement direction than the end portion in the first direction.

It is necessary that the battery pack spacer 140 is not deformed or damaged by a restraining force applied during the construction of the battery pack 10. That is, it is necessary that the withstand load of the battery pack spacer 140 is higher than the restraining force applied during the construction of the battery pack 10. Therefore, it is necessary that the withstand loads of the first region and the second region of the battery pack spacer 140 are higher than the restraining force applied during the construction of the battery pack 10. The restraining force of the battery pack 10 may be appropriately changed according to the size, kind, use, and the like of the battery pack 10 and, typically, may be set in a range where the surface pressure on the flat surfaces of the single cell is $10^4$ Pa to $10^6$ Pa (for example, $5 \times 10^4$ Pa to $5 \times 10^5$ Pa). In a case where the restraining force of the battery pack 10 is in the above-described range, the withstand load per unit area of the first region and the second region of the battery pack spacer 140 is preferably $1 \times 10^7$ Pa or higher (for example, $2 \times 10^7$ Pa or higher; typically, $3 \times 10^7$ Pa or higher).

Hereinafter, specific embodiments which can realize the battery pack spacer disclosed herein will be described. The following embodiments show examples of a battery pack which is preferably used in a posture in which the first direction matches with "upward direction" (that is, a direction opposite to the gravity direction). In this case, the second direction matches with "downward direction" (that is, the same direction as the gravity direction).

First Embodiment

Figure 4:
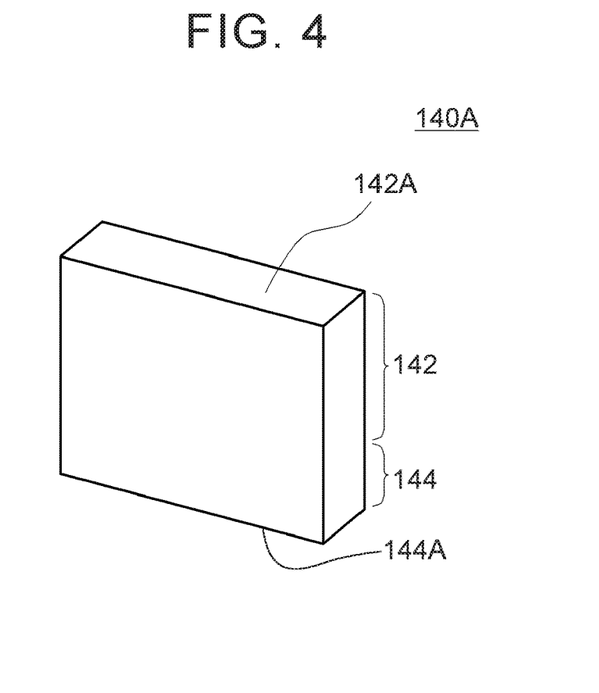
FIG. 4 is a perspective view schematically showing a battery pack spacer according to a first embodiment.
Figure 5:
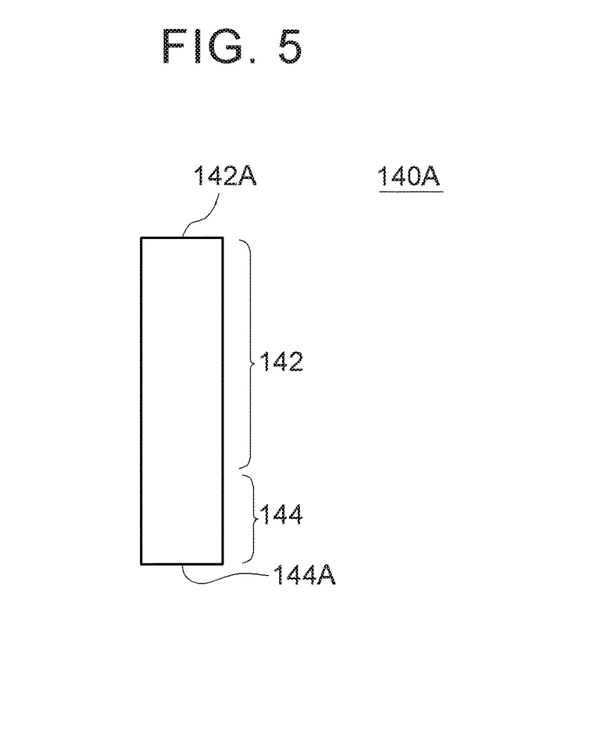
FIG. 5 is a side view schematically showing the battery pack spacer according to the first embodiment.

A first embodiment of the battery pack spacer disclosed herein will be described with reference to FIGS. 4 and 5. A battery pack spacer 140A according to the embodiment has a flat shape as a whole. As shown in FIGS. 4 and 5, the spacer 140A is divided into an upper region 142 and a lower region 144, the upper region 142 includes an upward-direction end portion 142A of the spacer 140A and occupies about ⅔ (volume ratio) of the entire region of the spacer 140A, and the lower region 144 includes a downward-direction end portion 144A of the spacer 140A and occupies about ⅓ (volume ratio) of the entire region of the spacer 140A. Materials constituting the upper region 142 and the lower region 144 are different from each other. That is, in the embodiment (and other embodiments described below), the lower region 144 is included in the second region, and the upper region 142 is composed of the first region and a portion of the second region (that is, a portion excluding the lower region 144). The embodiment (and other embodiments described below) shows an example in which a ratio of the volume of the lower region 144 to the total volume of the battery pack spacer is about ⅓. However, the ratio of the volume of the lower region 144 to the total volume of the battery pack spacer 140 disclosed herein is not limited to the above example. As long as it occupies half or less of the total volume of the battery pack spacer, the volume of the lower region 144 may be, for example, ½ (that is, substantially the entire region of the second region) or may be ⅓ or ¼ with respect to the total volume of the battery pack spacer.

Here, it is preferable that the material constituting the lower region 144 has higher compressibility than the material constituting the upper region 142. Alternatively, it is preferable that the material constituting the lower region 144 has a lower spring constant (or Young's modulus) than the material constituting the upper region 142. Alternatively, it is preferable that the material constituting the lower region 144 is mainly formed of a material having a lower withstand load than the material constituting the upper region 142.

Here, the compressibility values of the two kinds of materials can be relatively compared to each other through the following steps of: preparing block-shaped test pieces having the same shape from the respective materials; interposing each of the test pieces between two parallel plate surfaces; and measuring a relationship between stress and strain by applying a compressive force from both sides to the test piece until the test piece is broken. In general, physical properties of a material such as compressive strength may be set as a criterion for estimating the compressibility of the material.

The spring constant values of the two kinds of materials can be relatively compared to each other through the following steps of: preparing test pieces having the same shape from the respective materials; and measuring the elastic modulus of each of the test pieces. In general, physical properties of a material such as tensile modulus or bending modulus may be set as a criterion for estimating the spring constant of the material.

The withstand load values of the two kinds of materials can be relatively compared to each other through the following steps of: preparing block-shaped test pieces having the same shape from the respective materials; and measuring stress when a load is applied to each of the test pieces for a relatively short period of time (for example, several minutes) to cause yield. In general, physical properties of a material such as tensile break strength, tensile yield strength, or bending strength may be set as a criterion for estimating the withstand load of the material.

Here, the materials constituting the upper region 142 and the lower region 144 of the battery pack spacer 140A are not particularly limited as long as they satisfy the above-described preferable relationship in at least one of the compressibility, the spring constant, and the withstand load. For example, both the material constituting the upper region 142 and the material constituting the lower region 144 may be metals.

Alternatively, either the material constituting the upper region 142 or the material constituting the lower region 144 may be a nonmetal. Alternatively, both the material constituting the upper region 142 and the material constituting the lower region 144 may be nonmetals.

According to a preferable embodiment, the upper region 142 of the battery pack spacer 140A is formed of a nonmetal. For example, the upper region 142 of the battery pack spacer 140A may be formed of a resin. Examples of the resin constituting the upper region 142 include: a polyolefin resin such as a polyethylene (PE) resin, a polypropylene (PP) resin, or an ethylene-propylene copolymer resin; a polyester resin such as a polyethylene terephthalate (PET) resin; a vinyl chloride resin; a vinyl acetate resin; a polyimide resin; a polyamide resin; and a fluororesin.

Among these, a resin containing a polyolefin resin as a major component (for example, a component contained in the resin in an amount of higher than 50 wt %) can be preferably used as the resin constituting the upper region 142. The battery pack spacer 140A having the above-described composition is preferable from the viewpoints of recyclability and the like. The proportion of the polyolefin resin in the resin constituting the upper region 142 is preferably 60 wt % or higher and more preferably 75 wt %. The resin may substantially consist of only a polyolefin resin. "The resin substantially consist of only a polyolefin resin" represents that the proportion of the polyolefin resin in the resin is 99 wt % or higher. For example, a resin containing a PP resin can be preferably adopted as the polyolefin resin. In the resin, the content of the PP resin may be higher than 50 wt % (preferably 60 wt % or higher and more preferably 75 wt % or higher; for example, 99 wt % or higher).

According to a preferable embodiment, the lower region 144 of the battery pack spacer 140A is formed of a nonmetal. For example, the lower region 144 of the battery pack spacer 140A may be formed of a resin. Examples of the resin constituting the lower region 144 include: a polyolefin resin such as a PE resin, a PP resin, or an ethylene-propylene copolymer resin; a polyester resin such as a PET resin; a vinyl chloride resin; a vinyl acetate resin; a polyimide resin; a polyamide resin; and a fluororesin. Alternatively, the material constituting the lower region 144 may be, for example, a resin foam. Alternatively, the material constituting the lower region 144 may be, for example, an elastomer material such as butyl rubber, ethylene-propylene rubber, styrene-propylene rubber, fluororubber, or natural rubber.

As the material constituting the lower region 144, a combination of two or more kinds may be used as long as at least one of the following conditions is satisfied: the compressibility of the battery pack spacer 140A increases toward a lower region thereof; the spring constant thereof decreases; and the withstand load thereof decreases.

A combination of the resin constituting the upper region 142 and the resin constituting the lower region 144 is not particularly limited. For example, the resin constituting the upper region 142 may be mainly formed of a PP resin, and the resin constituting the lower region 144 may be mainly formed of a PE resin. Alternatively, for example, both the resin constituting the upper region 142 and the resin constituting the lower region 144 may be mainly formed of a PP resin, and the contents of the PP resin in the respective resins may be different from each other (preferably, the content of the PP resin in the resin constituting the upper region 142 may be higher than the content of the PP resin in the resin constituting the lower region 144). Alternatively, for example, both the resin constituting the upper region 142 and the resin constituting the lower region 144 may be mainly formed of an ethylene-propylene copolymer resin, and the contents of a propylene unit in the respective resins may be different from each other (preferably, the content of the propylene unit in the resin constituting the upper region 142 may be higher than the content of the propylene unit in the resin constituting the lower region 144).

Alternatively, for example, both the resin constituting the upper region 142 and the resin constituting the lower region 144 may be mainly formed of a PP resin, and the crystallinities of the respective resins may be different from each other (preferably, the crystallinity of the resin constituting the upper region 142 may be higher than the crystallinity of the resin constituting the lower region 144). Alternatively, for example, both the resin constituting the upper region 142 and the resin constituting the lower region 144 may be mainly formed of a PP resin, and the densities of the respective resins may be different from each other (preferably, the density of the resin constituting the upper region 142 may be higher than the density of the resin constituting the lower region 144). For example, the material constituting the upper region 142 may be mainly formed of a PP resin, and the material constituting the lower region 144 may be mainly formed of an elastomer material. For example, the material constituting the upper region 142 may be formed of a resin other than a resin foam, and the material constituting the lower region 144 may be formed of a resin foam.

The PP resin may contain various polymers containing propylene (propylene polymers) as a major component. The PP resin may be formed of substantially one propylene polymer or two or more propylene polymers. The concept of the propylene polymer described herein includes, for example, the following polypropylenes: a homopolymer of propylene (homopolypropylene); for example, isotactic polypropylene; a random copolymer (random polypropylene) of propylene and another α-olefin (typically, one kind or two or more kinds selected from ethylene and α-olefins having 4 to 10 carbon atoms); preferably, a random polypropylene containing propylene as a major monomer (major constituent monomer, that is, a component having a content of higher than 50 wt % with respect to the total weight of the monomers); for example, a random polypropylene obtained by random copolymerization between 96 mol % to 99.9 mol % of propylene and 0.1 mol % to 4 mol % of the other α-olefins (preferably ethylene and/or butene); a block copolymer (block polypropylene) which contains a copolymer (preferably, a copolymer containing propylene as a major monomer) and typically further contains a by-product, the copolymer being obtained by block copolymerization between propylene and another α-olefin (typically, one kind or two or more kinds selected from ethylene and α-olefins having 4 to 10 carbon atoms), and the by-product being a rubber component containing propylene and at least one of the other α-olefins; and for example, a block polypropylene which contains a polymer and further contains a by-product, the polymer being obtained by block copolymerization between 90 mol % to 99.9 mol % of propylene and 0.1 mol % to 10 mol % of the other α-olefins (preferably ethylene and/or butene), and the by-product being a rubber component containing propylene and at least one of the other α-olefins.

The PP resin may be substantially formed of one kind or two or more kinds selected from the above-described propylene polymers or may be a reactor blend type or dry blend type thermoplastic olefin resin (TPO) or thermoplastic elastomer (TPE), the reactor blend type being obtained by copolymerization between the propylene polymer and a large amount of rubber component, and the dry blend type being obtained by mechanically dispersing the rubber component in the propylene polymer. For example, the PP resin may be a PP resin which contains a copolymer between a monomer (functional group-containing monomer) having a polymerizable functional group and another functional group and propylene or may be a PP resin obtained by copolymerization between the functional group-containing monomer and the propylene polymer.

Among the battery pack spacer having the above-described configuration, the lower region of the battery pack spacer 140A is more likely to have higher compressibility in the spacer thickness direction (that is, in the single cell arrangement direction when the battery pack spacer 140A is used in the battery pack 10) than the upper region of the battery pack spacer 140A. In particular, in a case where an elastomer is used as the material constituting the lower region, the compressibility of the lower region is likely to be higher than that of the upper region. Alternatively, according to the above-described configuration, the withstand load of the lower region of the battery pack spacer 140A is likely to be lower than that of the upper region of the battery pack spacer 140A.

Second Embodiment

Figure 6:
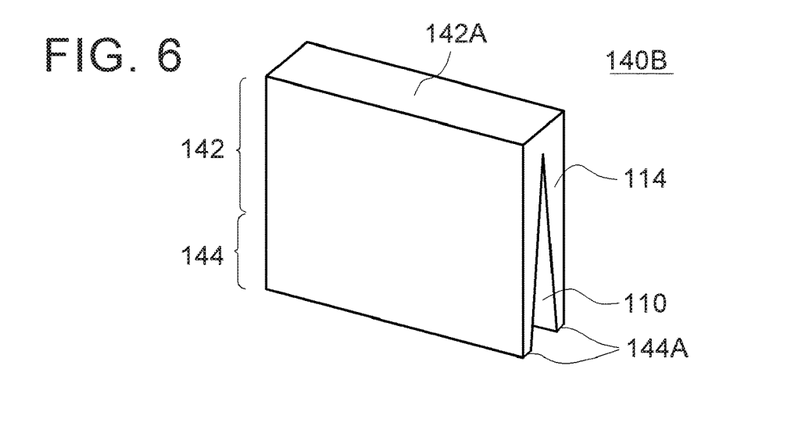
FIG. 6 is a perspective view schematically showing a battery pack spacer according to a second embodiment.
Figure 7:
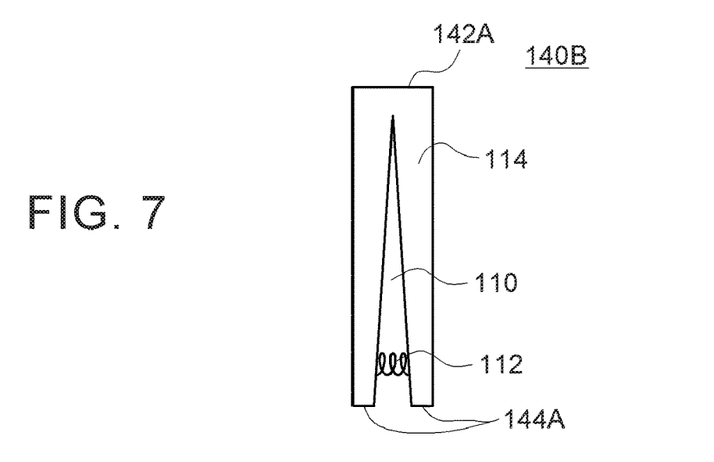
FIG. 7 is a side view schematically showing the battery pack spacer according to the second embodiment.

Another preferable embodiment will be described with reference to FIGS. 6 and 7. FIG. 6 is a perspective view schematically showing a battery pack spacer 140B according to an embodiment, and FIG. 7 is a side view showing the battery pack spacer 140B. As shown in FIGS. 6 and 7, in the battery pack spacer 140B disclosed herein, a wedge-shaped space 110 is formed in a region from a part of the bottom surface (the downward-direction end portion 144A) toward the inside of the battery pack spacer 140B. Specifically, the width of the space 110 is wide in the downward-direction end portion 144A of the battery pack spacer 140B and is gradually narrowed in the upward direction. In the wedge-shaped space 110 formed in the lower region 144 of the battery pack spacer 140B, at least one spring 112 is provided. The spring 112 connects inner walls of the battery pack spacer 140B constituting the wedge-shaped space 110 to each other. Due to the above-described configuration (that is, due to the configuration in which the space 110 is formed), the downward-direction end portion 144A has a smaller thickness in the single cell arrangement direction than the upward-direction end portion 142A.

The kind of the spring 112 used in the battery pack spacer 140B disclosed herein is not particularly limited. The spring 112 may be, for example, a coil spring, a disc spring, or a plate spring. A material of a portion (hereinafter, referred to as "main portion 114") of the battery pack spacer 140B other than the spring is not particularly limited. For example, as the material constituting the main portion 114, the same materials as the preferable examples described above as the material constituting the upper region 142 in the description of the first embodiment can be preferably used.

Due to a lower load, the portion where the spring 112 is provided is more likely to be compressed in the spacer thickness direction than the main portion 114. Therefore, according to the battery pack spacer 140B having the above-described configuration, the lower region 144 is more likely to have higher compressibility in the spacer thickness direction (single cell arrangement direction) than the upper region 142. According to the above-described configuration, the withstand load of the lower region 144 of the battery pack spacer 140B is likely to be lower than that of the upper region 142 of the battery pack spacer 140B.

Third Embodiment

Figure 8:
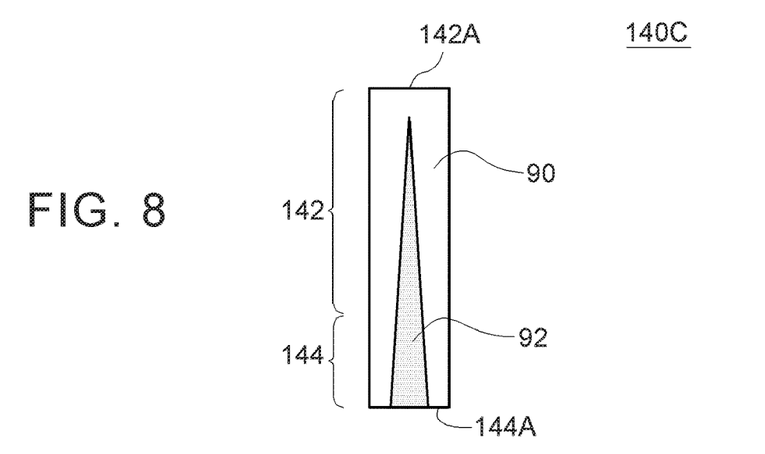
FIG. 8 is a side view schematically showing a battery pack spacer according to a third embodiment.

Still another preferable embodiment will be described with reference to FIG. 8. FIG. 8 is a side view schematically showing a battery pack spacer 140C according to an embodiment. The battery pack spacer 140C disclosed herein includes two or more portions (in FIG. 8, two portions) formed of different materials. Typically, one portion (hereinafter, referred to as "main portion 90") is mainly formed of the battery pack spacer 140C and includes at least two flat surfaces and a top surface (upward-direction end portion 142A) of the battery pack spacer 140C. The other portion (hereinafter, referred to as "inner portion 92") has a wedge-shaped portion which is formed in a region from the bottom surface (the downward-direction end portion 144A) toward the inside of the battery pack spacer 140C. Specifically, the width of the inner portion 92 is wide in the downward-direction end portion 144A of the battery pack spacer 140C and is gradually narrowed (reduced) in the upward direction.

Here, it is preferable that a material constituting the inner portion 92 is different from a material constituting the main portion 90. Specifiably, it is preferable that the material constituting the inner portion 92 has higher compressibility than the material constituting the main portion 90. Alternatively, it is preferable that the material constituting the inner portion 92 has a lower spring constant than the material constituting the main portion 90. Alternatively, it is preferable that the material constituting the inner portion 92 has a lower withstand load than the material constituting the main portion 90.

In the embodiment shown in FIG. 8, as the material constituting the main portion 90, the same materials as the preferable examples described above as the material constituting the upper region 142 in the description of the first embodiment can be preferably used. In the embodiment shown in FIG. 8, as the material constituting the inner portion 92, the same materials as the preferable examples described above as the material constituting the lower region 144 in the description of the first embodiment can be preferably used. Regarding a preferable combination of the material constituting the main portion 90 and the material constituting the inner portion 92, for example, the same combination as the preferable combination of the material constituting the upper region 142 and the material constituting the lower region 144 in the description of the first embodiment can be preferably used.

According to the battery pack spacer 140C having the above-described configuration, the lower region 144 of the battery pack spacer 140C is more likely to have higher compressibility in the spacer thickness direction (single cell arrangement direction) than the upper region 142 of the battery pack spacer 140C. In particular, in a case where an elastomer is used as the material constituting the inner portion 92, the compressibility of the lower region 144 is likely to be higher than that of the upper region 142. According to the above-described configuration, the withstand load of the lower region 144 of the battery pack spacer 140C is likely to be lower than that of the upper region 142 of the battery pack spacer 140C.

Fourth Embodiment

Figure 9:
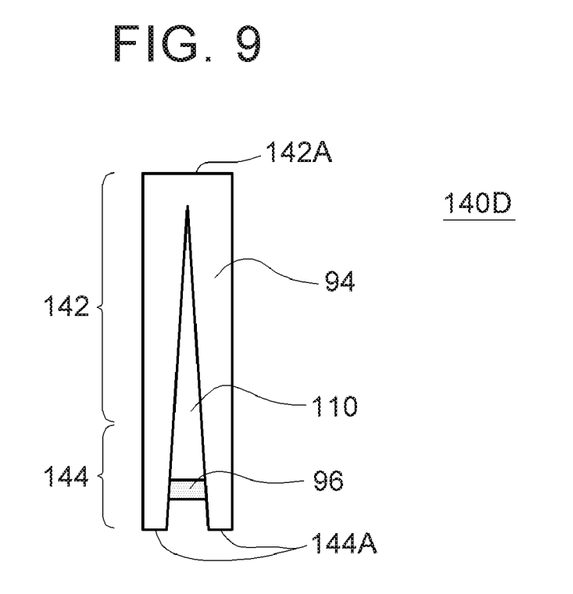
FIG. 9 is a side view schematically showing a battery pack spacer according to a fourth embodiment.

Still another preferable embodiment will be described with reference to FIG. 9. FIG. 9 is a side view schematically showing a battery pack spacer 140D according to an embodiment. In the battery pack spacer 140D disclosed herein, as in the case of the above-described second embodiment, the space (wedge-shaped space) 110 is formed, and the width thereof is wide in the downward-direction end portion 144A of the battery pack spacer 140D and is gradually narrowed in the upward direction. In the wedge-shaped space 110 formed in the lower region 144 of the battery pack spacer 140D, a structure (hereinafter, referred to as "bridge portion 96") which bridges inner walls of the battery pack spacer 140D constituting the wedge-shaped space 110 to each other is formed.

A material of a portion (hereinafter, referred to as "main portion 94") of the battery pack spacer 140D other than the bridge portion 96 is not particularly limited. For example, as the material constituting the main portion 94, the same materials as the preferable examples described above as the material constituting the upper region 142 in the description of the first embodiment can be preferably used. The material constituting the bridge portion 96 may be the same as or different from the material constituting the main portion 94. In a case where the material constituting the bridge portion 96 is different from the material constituting the main portion 94, it is preferable that the material constituting the bridge portion 96 has higher compressibility than the material constituting the main portion 94. Alternatively, it is preferable that the material constituting the bridge portion 96 has a lower spring constant than the material constituting the main portion 94. Alternatively, it is preferable that the material constituting the bridge portion 96 has a lower withstand load than the material constituting the main portion 94. For example, as the material constituting the bridge portion 96, the same materials as the preferable examples described above as the material constituting the lower region 144 in the description of the first embodiment can be preferably used.

According to the battery pack spacer 140D having the above-described configuration, the lower region 144 of the battery pack spacer 140D is more likely to have higher compressibility in the spacer thickness direction (single cell arrangement direction) than the upper region 142 of the battery pack spacer 140D. According to the above-described configuration, the withstand load of the lower region 144 of the battery pack spacer 140D is likely to be lower than that of the upper region 142 of the battery pack spacer 140D.

Fifth Embodiment

Figure 10:
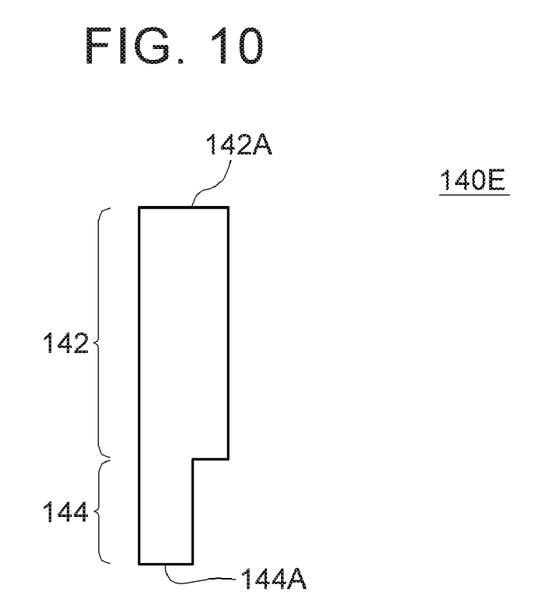
FIG. 10 is a side view schematically showing a battery pack spacer according to a fifth embodiment.

Still another preferable embodiment will be described with reference to FIG. 10. FIG. 10 is a side view schematically showing a battery pack spacer 140E according to an embodiment. The battery pack spacer 140E disclosed herein includes the upper region 142 and the lower region 144 having different thicknesses in the single cell arrangement direction. Specifically, in the same arrangement direction, the thickness of the lower region 144 is smaller than the thickness of the upper region 142. In other words, in the battery pack spacer 140E according to the embodiment, the downward-direction end portion 144A has a smaller thickness in the single cell arrangement direction than the upward-direction end portion 142A.

Here, in the battery pack spacer 140E, the material constituting the upper region 142 and the material constituting the lower region 144 may be the same as or different from each other. From the viewpoint of formability and the like, it is preferable that, in the battery pack spacer 140E, the material constituting the upper region 142 and the material constituting the lower region 144 are the same as each other.

The thickness of the lower region 144 in the single cell arrangement direction is preferably 30% or higher and more preferably 40% or higher (for example, 50% or higher) with respect to the thickness of the upper region 142 in the single cell arrangement direction. When the thickness of the lower region 144 is the lower limit value or larger, an appropriate restraining force is likely to be applied during the construction of the battery pack. On the other hand, the thickness of the lower region 144 is preferably 95% or lower and more preferably 90% or lower (for example, 80% or lower) with respect to the thickness of the upper region 142. When the thickness of the lower region 144 is the upper limit or lower, the withstand load of the lower region is likely to be lower than that of the upper region.

In the embodiment shown in FIG. 10, the battery pack spacer 140E which includes two regions (the upper region 142 and the lower region 144) having different thicknesses in the single cell arrangement direction has been described as an example. However, the battery pack spacer disclosed herein may include three or more regions having different thicknesses.

According to the battery pack spacer 140E having the above-described configuration, the withstand load of the lower region 144 is likely to be lower than that of the upper region 142.

Hereinafter, several examples relating to the invention will be described, but the examples according to the invention are not intended to limit the invention. Using the battery pack spacers according to the first embodiment, the second embodiment, the third embodiment, the fourth embodiment, and the fifth embodiment, battery packs shown in FIG. 1 was constructed, respectively. These battery pack were set as battery packs according to Examples 1 to 5, respectively.

Specifically, battery packs according to the respective Examples were constructed as follows.

Example 1

A lithium ion secondary battery was prepared as a single cell. The lithium ion secondary battery has a configuration in which a flat wound electrode body and a nonaqueous electrolytic solution were accommodated in a flat cuboid aluminum case, the flat wound electrode body including:

sheet-shaped electrodes in which positive and negative electrode active materials are held in positive and negative electrode current collectors; and a separator that is interposed between the electrodes. The size of a flat surface of the single cell (that is, a wide surface facing the single cell arrangement direction) is length 50 mm×width 150 mm. Here, the single cell includes positive and negative electrode terminals which protrude in the upward direction. As shown in FIG. 1, four single cells were arranged such that directions in which terminals protrude are the same as each other. At this time, the battery pack spacer (refer to FIGS. 4 and 5) according to the first embodiment were arranged at five positions including three positions between the single cells and both outsides in the single cell arrangement direction. By applying a load (restraining force) to the single cells using a restraining member provided around the arranged single cells, the single cells were restricted such that a surface pressure applied to the flat surfaces of the single cells in the arrangement direction was about $5 \times 10^5$ Pa. Next, at a position between adjacent single cells, a positive electrode terminal of one single cell was electrically connected to a negative electrode terminal of the other single cell through a connector. In this way, a battery pack according to Example 1 was constructed.

Here, in the battery pack spacer 140A according to the first embodiment, a block polypropylene (block PP resin) containing 90 mol % to 99.9 mol % of a propylene component was used as a material constituting the upper region 142. A PE resin was used as a material constituting the lower region 144. In the battery pack spacer 140A, the lower region 144 occupied about ⅓ (volume ratio) of the entire region of the spacer 140A.

Example 2

A battery pack according to Example 2 was constructed using the same method as that of the battery pack according to Example 1, except that the battery pack spacer used was changed to the battery pack spacer 140B according to the second embodiment (refer to FIGS. 6 and 7). Here, in the battery pack spacer 140B according to the second embodiment, a block polypropylene (block PP resin) containing 90 mol % to 99.9 mol % of a propylene component was used as a material constituting the portion 84 other than the spring. As the spring 82, one coil spring having a coil diameter of 20 mm was used.

Example 3

A battery pack according to Example 3 was constructed using the same method as that of the battery pack according to Example 1, except that the battery pack spacer used was changed to the battery pack spacer 140C according to the third embodiment (refer to FIG. 8). Here, in the battery pack spacer 140C according to the third embodiment, a block polypropylene (block PP resin) containing 90 mol % to 99.9 mol % of a propylene component was used as a material constituting the main portion 90. A PE resin was used as a material constituting the inner portion 92.

Example 4

A battery pack according to Example 4 was constructed using the same method as that of the battery pack according to Example 1, except that the battery pack spacer used was changed to the battery pack spacer 140D according to the fourth embodiment (refer to FIG. 9). Here, in the battery pack spacer 140D according to the fourth embodiment, a block polypropylene (block PP resin) containing 90 mol % to 99.9 mol % of a propylene component was used as a material constituting the main portion 94. A resin containing styrene-butadiene rubber (SBR) as a major component was used as a material constituting the bridge portion 96.

Example 5

A battery pack according to Example 5 was constructed using the same method as that of the battery pack according to Example 1, except that the battery pack spacer used was changed to the battery pack spacer 140E according to the fifth embodiment (refer to FIG. 10). Here, a block polypropylene (block PP resin) containing 90 mol % to 99.9 mol % of a propylene component was used as a material constituting the battery pack spacer 140E according to the fifth embodiment. The thickness of the lower region 144 in the single cell arrangement direction was about 70% with respect to the thickness of the upper region 142.

Comparative Example 1

A battery pack according to Comparative Example 1 was constructed using the same method as that of the battery pack according to Example 1, except that the battery pack spacer used was changed to a battery pack spacer according to Comparative Example 1. Here, the battery pack spacer according to Comparative Example 1 had a flat shape and was formed of a block polypropylene (block PP resin) containing 90 mol % to 99.9 mol % of a propylene component.

<Crushing Test>

In a crushing test, the battery pack according to each of the examples was pressed between pressing plates (length 300 mm×width 150 mm) from both outsides in the single cell arrangement direction, and a load was applied to the center in the arrangement direction. The load was applied under conditions of pressing rate: 5 mm/sec and pressing pressure (total pressure from both sides): about $10^8$ Pa to $10^9$ Pa until the length of the battery pack in the arrangement direction was about 90% with respect to the length of the battery pack before the crushing test (that is, until the battery pack was compressed by about 10% of the length of the battery pack in the arrangement direction). At this time, which one of the upward-direction end portion and the downward-direction end portion of the battery pack was deformed first was determined by visual inspection.

As a result, in the battery pack spacers according to Examples 1 to 5 having a configuration in which the second region had higher compressibility in the single cell arrangement direction than the first region or a configuration in which the second region had a lower withstand load than the first region, the downward-direction end portion (that is, the end portion in the second direction) was more likely to be deformed than the upward-direction end portion (that is, the end portion in the first direction). On the other hand, in the battery pack according to Comparative Example 1 having a configuration in which the entire region of the flat battery pack spacer was formed of one material, the probability that the upward-direction end portion was deformed first was substantially the same as the probability that the downward-direction end portion was deformed first. It can be said that the reason for this is as follows: in the battery pack spacer according to Comparative Example 1, there was no distribution in the compressibility in the arrangement direction and in the withstand load; therefore, due to a small difference in a method of applying a load to the battery pack, the distance between the single cells in the upper region was reduced first or the distance between the single cells in the lower region was reduced first.

Hereinabove, specific examples of the invention have been described in detail. However, these examples are merely exemplary and do not limit the claims. The technique described in the claims of the present application includes various modifications and alternations of the above-described specific examples.

For example, the technique according to claims of the present application includes a battery pack spacer obtained by combination of at least two of the above-described first to fifth embodiments. In the above-described specific example, the direction in which terminals of the single cell protrude is set as the upward direction (direction opposite to the gravity direction), but claims of the present application are not limited thereto. For example, the technique according to claims of the present application is also applicable to a battery pack or a battery pack spacer which is used in a posture in which the terminal protruding direction is set as a direction other than the upward direction.

The battery pack 10 shown in FIG. 1 has a simple configuration for easy understanding of the invention. However, it is obvious to those skilled in the art that various modifications and additions can be made within a range where the configuration and effects of the invention do not deteriorate. For example, in a case of being mounted on a vehicle such as an automobile, an external cover for protecting major components (for example, a group of single cells) of a battery pack, a component for fixing the battery pack to a predetermined position of the vehicle, a component for connecting plural battery packs (battery module) to each other, and the like may be provided. However, the technical scope of the invention does not depend on whether or not the above components are provided.

What is claimed is:

1. A battery pack spacer which is arranged between adjacent single cells in a battery pack constructed by arranging a plurality of single cells in a predetermined arrangement direction, each of the single cells including terminals which protrude in a direction perpendicular to the arrangement direction, the battery pack spacer comprising:
    a first region; and
    a second region,
    wherein
    the direction in which the terminals protrude is set as a first direction,
    a direction opposite to the first direction is set as a second direction,
    in the first direction and the second direction of the battery pack spacer arranged between the single cells, the spacer is divided into the first region and the second region, the first region includes an end portion in the first direction and occupies half of an entire region of the spacer in the second direction from the end portion in the first direction, the second region includes an end portion in the second direction and occupies half of the entire region of the spacer in the first direction from the end portion in the second direction, and wherein a wedge-shaped space is formed in the battery pack spacer, so that a width of the space, as viewed along the arrangement direction, is widest at the end portion in the second direction, and gradually narrows toward the end portion in the first direction until no space is formed in the end portion in the first direction so the second region has higher compressibility in the arrangement direction than the first region.

2. The spacer according to claim 1, wherein the second region is mainly formed of a material having higher compressibility and/or a material having a lower withstand load than the first region.

3. The spacer according to claim 1, wherein the first region is mainly formed of a polyolefin resin.

4. The spacer according to claim 1, wherein the second region is mainly formed of an elastomer.

5. A battery pack spacer which is arranged between adjacent single cells in a battery pack constructed by arranging a plurality of single cells in a predetermined arrangement direction, each of the single cells including terminals which protrude in a direction perpendicular to the arrangement direction, the battery pack spacer comprising:
a first region; and
a second region, wherein
the direction in which the terminals protrude is set as a first direction,
a direction opposite to the first direction is set as a second direction,
in the first direction and the second direction of the battery pack spacer arranged between the single cells, the spacer is divided into the first region and the second region,
the first region includes an end portion in the first direction and occupies half of an entire region of the spacer in the second direction from the end portion in the first direction,
the second region includes an end portion in the second direction and occupies half of the entire region of the spacer in the first direction from the end portion in the second direction, and
wherein a wedge-shaped space is formed in the battery pack spacer, so that a width of the space, as viewed along the arrangement direction, is widest at the end portion in the second direction, and gradually narrows toward the end portion in the first direction until no space is formed in the end portion in the first direction so the second region has a lower withstand load in the arrangement direction than the first region.

6. The spacer according to claim 5, wherein the second region is mainly formed of a material having higher compressibility and/or a material having a lower withstand load than the first region.

7. The spacer according to claim 5, wherein the first region is mainly formed of a polyolefin resin.

8. The spacer according to claim 5, wherein the second region is mainly formed of an elastomer.

9. A battery pack spacer which is arranged between adjacent single cells in a battery pack constructed by arranging a plurality of single cells in a predetermined arrangement direction,
each of the single cells including terminals which protrude in a direction perpendicular to the arrangement direction, wherein
the direction in which the terminals protrude is set as a first direction,
a direction opposite to the first direction is set as a second direction, and
in the first direction and the second direction of the battery pack spacer arranged between the single cells, a wedge-shaped space is formed in the battery pack spacer, so that a width of the space, as viewed along the arrangement direction, is widest at the end portion in the second direction, and gradually narrows toward the end portion in the first direction until no space is formed in the end portion in the first direction so that an end portion in the second direction has a smaller thickness in the arrangement direction than an end portion in the first direction.

10. The spacer according to claim 9, further comprising, a first region and
a second region, wherein
the first region includes the end portion in the first direction and occupies half of an entire region of the spacer in the second direction from the end portion in the first direction,
the second region includes the end portion in the second direction and occupies half of the entire region of the spacer in the first direction from the end portion in the second direction,
the second region is mainly formed of a material having higher compressibility and/or a material having a lower withstand load than the first region.

11. The spacer according to claim 9, further comprising, a first region and
a second region, wherein
the first region includes the end portion in the first direction and occupies half of an entire region of the spacer in the second direction from the end portion in the first direction,
the second region includes the end portion in the second direction and occupies half of the entire region of the spacer in the first direction from the end portion in the second direction, wherein
the first region is mainly formed of a polyolefin resin.

12. The spacer according to claim 9, further comprising, a first region and
a second region, wherein
the first region includes the end portion in the first direction and occupies half of an entire region of the spacer in the second direction from the end portion in the first direction,
the second region includes the end portion in the second direction and occupies half of the entire region of the spacer in the first direction from the end portion in the second direction, wherein
the second region is mainly formed of an elastomer.

13. The spacer according to claim 9, further comprising, a first region and
a second region, wherein
the first region includes the end portion in the first direction and occupies half of an entire region of the spacer in the second direction from the end portion in the first direction, the second region includes the end portion in the second direction and occupies half of the entire region of the spacer in the first direction from the end portion in the second direction.

14. The spacer according to claim 1, wherein a spring is disposed in the wedge-shaped space, which compresses in the arrangement direction of the plurality of cells.

15. The spacer according to claim 1, wherein a material having a higher compressibility is disposed within the wedge-shaped space, than a material forming the first region of the spacer.

* * * * *